United States Patent [19]

Sekine et al.

[11] Patent Number: 4,517,096
[45] Date of Patent: May 14, 1985

[54] METHOD OF SELECTIVE SEPARATION AND CONCENTRATION OF GALLIUM AND/OR INDIUM FROM SOLUTIONS CONTAINING LOW LEVELS OF THEM AND HIGH LEVELS OF OTHER METAL IONS

[75] Inventors: Kunio Sekine, Narashino; Hitoshi Masuda; Kodo Ishibashi, both of Kosakamachi; Masahide Hirai, Kusatsu; Shozo Tomoshige; Kozo Kondo, both of Uji, all of Japan

[73] Assignees: Dowa Mining Co., Ltd., Tokyo; Unitika, Ltd., Amagasaki, both of Japan

[21] Appl. No.: 596,539

[22] Filed: Apr. 4, 1984

[30] Foreign Application Priority Data

Apr. 7, 1983 [JP] Japan .................... 58-60013

[51] Int. Cl.³ .................................. B01D 15/04
[52] U.S. Cl. .................................. 210/668; 210/670; 210/688; 423/112
[58] Field of Search ........... 210/670, 672, 677, 688, 210/668, 669; 423/112, DIG. 14; 75/101 BE

[56] References Cited

U.S. PATENT DOCUMENTS

| 3,928,192 | 12/1975 | Katzakian et al. | 210/670 |
| 3,936,399 | 2/1976 | Hirai et al. | 210/688 |
| 4,193,968 | 3/1980 | Sullivan et al. | 423/DIG. 14 |
| 4,266,045 | 5/1981 | Uejima et al. | 210/688 |
| 4,292,284 | 9/1981 | Tomii et al. | 423/112 |
| 4,404,174 | 9/1983 | Leveque et al. | 75/101 BE |
| 4,438,078 | 3/1984 | Nalewajek | 423/112 |

Primary Examiner—Ivars Cintins
Attorney, Agent, or Firm—Frishauf, Holtz, Goodman & Woodward

[57] ABSTRACT

A novel method is disclosed which enables gallium and/or indium to be selectively separated and concentrated from a solution containing them in very low concentrations together with many other metal ions in rather high concentrations. The solution is passed through a bed of a chelating ion exchange resin having an amino carboxylic acid group either immediately or after the pH adjustment. Gallium and/or indium adsorbed on the chelate resin is desorbed by eluting with a mineral acid. The eluate, after the pH adjustment, is passed through another bed of a chelating ion exchange resin having an amino carboxylic acid group, and the resin is treated with a mineral acid to elute the metal ions adsorbed on the resin to thereby recover gallium and/or indium in the form of a concentrated solution.

9 Claims, 3 Drawing Figures

METHOD OF SELECTIVE SEPARATION AND CONCENTRATION OF GALLIUM AND/OR INDIUM FROM SOLUTIONS CONTAINING LOW LEVELS OF THEM AND HIGH LEVELS OF OTHER METAL IONS

FIELD OF THE INVENTION

The present invention relates to an efficient method for selective separation and concentration of gallium and/or indium from a solution which contains low levels of gallium and/or indium and which also contains high levels of salts of other metals.

DESCRIPTION OF THE PRIOR ART

Gallium or indium is contained in low levels in slimes, muds or liquors resulting from various processes for smelting metals and other chemicals treatment processes. Industrially, such slimes, muds or liquors are important source materials for gallium or indium. However, they usually contain very low levels of gallium or indium whereas the levels of other metals such as Fe, Al, Zn, As and Na are relatively high.

Conventionally, gallium or indium is recovered from such slimes or muds by solvent extraction applied to a liquor containing low levels of gallium and/or indium which is prepared by dissolving the slimes or muds with an acid. Methods have been proposed for obtaining a gallium and/or indium concentrate by liquid-liquid extraction with organic solvents such as isopropyl ether, tributyl phosphate, methyl isobutyl ketone and tertiary saturated fatty acids. Using isopropyl ether, tributyl phosphate or methyl isobutyl ketone is an effective method for selective extraction of gallium and/or indium. However, in order to obtain the aqueous phase for extraction, a high concentration of HCl is required, and the solvents used, especially isopropyl ether and methyl isobutyl ketone, have only a short life since they dissolve in the aqueous phase in large quantities. The other method using a tertiary saturated fatty acid is less costly (the solvent is cheap) and can be operated with a relatively wide range of acid types and for a relatively wide range of gallium or indium levels. However, the percent extraction that can be achieved by this method is very low if process conditions with regard to the type and concentration of metal salts present in the aqueous phase in addition to gallium or indium are not favorable. Furthermore, all methods of solvent extraction have one common problem, that is, the solvent is taken up by or dissolved in the residual liquor in the form of liquid droplets.

SUMMARY OF THE INVENTION

The primary object of the present invention is to develop an industrially effective method for selective separation and concentration of gallium and/or indium involving no solvent extraction from a solution which contains very low levels of gallium and/or indium and which also contains relatively high levels of salts of other metals. As a result of various studies made to attain this object, the present inventors have successfully accomplished an industrially advantageous method for selective recovery of gallium and/or indium from a liquor containing not only gallium or indium but also various other metals. The method comprises passing a gallium- and/or indium-containing solution through a bed of a chelating ion exchange resin having an amino carboxylic acid group either immediately or after adjustment to a pH between 1.0 and 4.0, said solution also containing metal ions other than gallium and indium in concentrations at least ten times that of gallium and/or indium; desorbing the metal ions from the resin by eluting with a mineral acid; adjusting the pH of the eluate to between 1.0 and 4.0; passing the adjusted eluate through a bed of a chelating ion exchange resin having an amino carboxylic acid group; and eluting the materials on the resin with a mineral acid, thereby recovering gallium and/or indium which is present in a concentrated form in the resulting eluate.

According to the present invention, gallium and/or indium present in small or minute amounts of a solution which also contains relatively high levels of salts of other metals can be separated in a concentrated form by use of an ion exchange resin. The invention proposes the use of an ion exchange resin for selective recovery of small or minute amounts of gallium and/or indium from slimes, muds or liquors that result in large quantities from various processes for smelting metals or from other chemical treatment processes. In the absence of an effective method available currently for selective recovery of gallium and/or indium from smelter slimes or effluent liquors by means of an ion exchange resin, the method of the present invention will introduce a new technique into industry for selective recovery of gallium and/or indium.

The present invention is based on the finding that a chelate resin prepared by crosslinking in a network structure a phenolic compound of the formula:

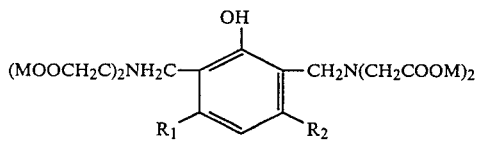

(wherein M is an alkali metal or hydrogen; $R_1$ and $R_2$ are each hydrogen or an alkyl group having 1 to 3 carbon atoms), a phenol and an aldehyde has the ability to preferentially adsorb gallium and/or indium present in small or minute amounts in a solution containing rather high levels of other metal ions. The chelate resin itself is already known and shown in Japanese Patent Laid-Open No. 121241/79 as an ion exchange resin capable of reducing the concentration of Fe ions in an acidic zinc electro plating bath. A commercial product is available from UNITIKA, LTD. under the trade name "UNICELLEX UR-50®".

DETAILED DESCRIPTION OF THE INVENTION

Figure 1:
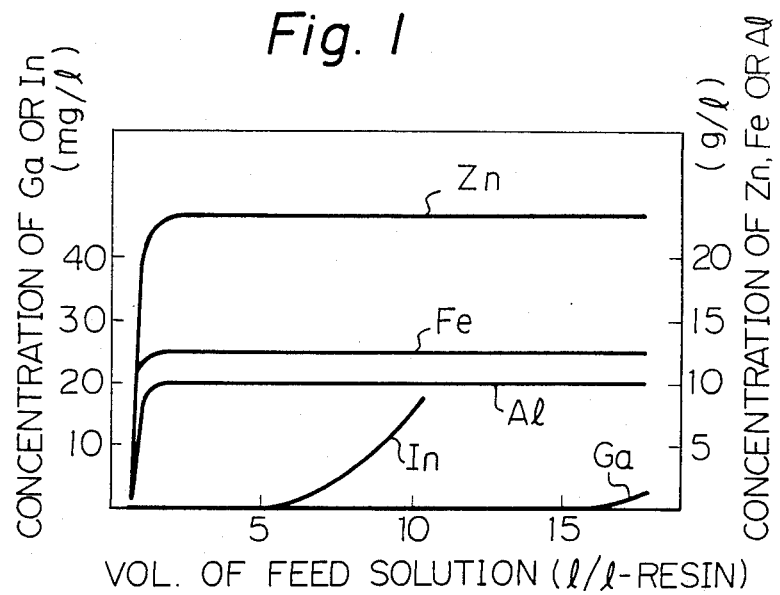
FIG. 1 is a graph showing the breakthrough point vs. feeding through a chelate resin of a pH-adjusted and reducing solution containing high Zn, Fe and Al levels but low Ga and In levels.

In practicing the method of the present invention, adsorption and elution cycles are preferably repeated using at least two columns packed with the chelating ion exchange resin specified above. The solution to be treated by the method of the present invention is an industrially collected solution containing low gallium and/or indium levels, and also containing other metal ions whose concentration is at least ten times that of gallium and/or indium. Examples of such solution include leach solutions produced in zinc smelting processes, and acidic solutions prepared by dissolving aluminum slimes or muds. More specifically, the method of the present invention is intended for treatment of an industrially collected solution which contains 0.001 to 1.0 (g/1,000 ml) of gallium and/or indium, and 2 to 70 (g/1,000 ml) or higher of Fe, Al, Zn, As, Na and other metal ions taken either independently or in combination. Stated more particularly, the solution to be treated by the method of the present invention contains 0.01 to 1 (g/1,000 ml) of gallium and/or indium in the presence of about 5 to 50 (g/1,000 ml) of zinc, 5 to 30 (g/1,000 ml) of iron and 5 to 40 (g/1,000 ml) of aluminum. Preferably, this solution is first adjusted to a pH between 1.0 and 4.0, preferably between 2.0 and 3.0. If the solution contains ferric ions, they are reduced to ferrous ions by treatment with a reducing agent such as sulfur dioxide gas or sodium bi-sulfite. The solution so treated is then passed through a column packed with the chelating ion exchange resin of the type described above at a space velocity (S.V.) of not more than 5.0, preferably between 0.5 and 1.5. By this first passage through the ion exchange column, only gallium and/or indium are preferentially adsorbed on the chelating ion exchange resin. The solution is brought into contact with the ion exchange resin typically at between 10° and 50° C., preferably between 35° and 45° C.

A solution of sulfuric acid containing a small or minute amount of gallium and/or indium and 10 to 20 (g/1,000 ml) each of zinc, iron and aluminum was adjusted to a pH of 2.8, and after treating it to maintain the reducing nature of the solution by addition of sodium hydrogensulfite, the solution was passed through a chelating ion exchange resin having an amino carboxylic acid group at a S.V. of 1.0. The resulting profile of liquid feed vs. breakthrough point is shown in FIG. 1, from which one can see that gallium and/or indium present in low levels in a solution together with high levels of other metals can be selectively adsorbed on the ion exchange resin under the specified conditions.

Gallium and/or indium can be easily desorbed from the resin by eluting with a mineral acid such as sulfuric acid or hydrochloric acid. The concentration of sulfuric acid used as an eluant is generally from 1N to 6N, preferably from 3N to 4N. The concentration of hydrochloric acid generally ranges from 1N to 6N, preferably from 2N to 3N. By this elution step, a solution containing 0.01 to 10 (g/1,000 ml) of gallium and/or indium while having low levels of other metal ions can be obtained as an eluate.

As in the first adsorption step, this eluate is adjusted to a pH between 1.0 and 4.0, preferably between 2.0 and 3.0, and is optionally treated with a reducing agent to achieve ferric to ferrous ions conversion. The so treated eluate is passed through a bed (i.e., a column packed with the bed) of chelating ion exchange resin having an amino carboxylic acid group which is of the same type as that used in the first adsorption step. The passage rate is not more than an S.V. of 5.0, preferably between 1.0 and 3.0. By this second adsorption step, gallium and/or indium can be selectively adsorbed on the resin. The eluate is brought into contact with the ion exchange resin typically at between 10° and 50° C., preferably between 20° and 30° C.

Figure 2:
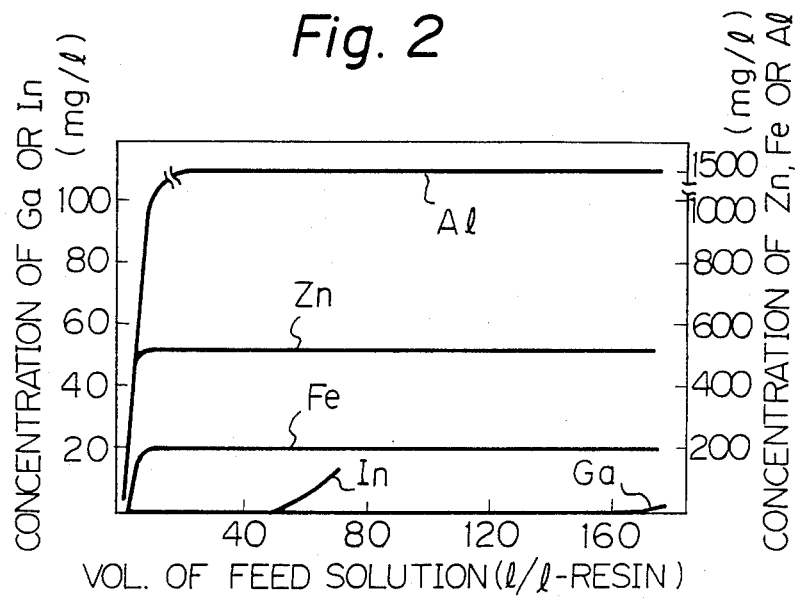
FIG. 2 is a graph showing the breakthrough point vs. feeding through a chelate resin of a pH-adjusted and reducing eluate.

The eluate obtained by the experiment shown in FIG. 1 was adjusted to a pH of 2.8 and passed through a bed of chelating ion exchange resin having an amino carboxylic acid group at a rate of S.V. 2.0. The resulting profile of eluate feed vs. breakthrough point is shown in FIG. 2, from which one can see that gallium and/or indium can be selectively adsorbed on the ion exchange resin under the specified conditions.

Figure 3:
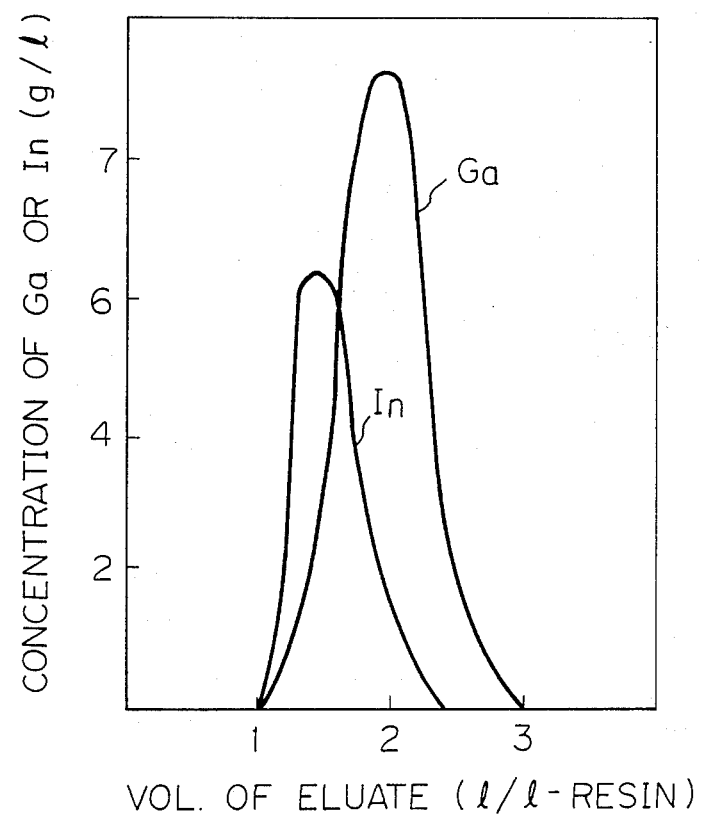
FIG. 3 is a graph showing the Ga and In levels in an eluate obtained by treatment with 2N HCl.

As in the elution step following the first adsorption stage, gallium and/or indium can be easily desorbed from the resin by elution with a mineral acid such as sulfuric acid or hydrochloric acid. If sulfuric acid is used, its concentration generally ranges from 1N to 6N, preferably from 3N to 4N. If hydrochloric acid is used, the concentration range is generally from 1N to 6N, preferably from 2N to 3N. As a result, an eluate having a very high concentration (0.1 to 50 g/1,000 ml) of gallium and/or indium can be obtained. The eluate contains only small or minute amounts of other metal ions and provides a concentrate of gallium and/or indium. FIG. 3 is an elution curve obtained when gallium and/or indium was desorbed from the ion exchange resin by elution with 2N HCl.

The advantages of the method of the present invention will become apparent by reading the following non-limiting examples.

EXAMPLE 1

In this example, gallium and indium were selectively recovered from a leach solution (a solution of sulfuric acid) that derived from zinc smelting and which had the composition shown in Table 1.

TABLE 1

| Composition of leach solution (g/1,000 ml) | | | | | |
|---|---|---|---|---|---|
|  | Ga | In | Zn | Al | Fe |
| Absolute content | 0.11 | 0.13 | 22.6 | 10.9 | 12.7 |
| Relative content | 1 | 1.18 | ca. 200 | ca. 100 | ca. 100 |

$$\text{Relative content} = \frac{\text{concentration of a particular ion species in leach solution}}{\text{concentration of Ga in leach solution}}$$

Six liters of the leach solution was adjusted to a pH of 2.8 with an alkali agent. After adding sodium hydrogensulfite to maintain its reducing nature, the leach solution was passed through a column packed with 1.2 liters of UNICELLEX UR-50®, a chelating ion exchange resin manufactured by UNITIKA, LTD. The feed rate was S.V. 1.0. Six liters of an effluent was obtained, and it had the composition shown in Table 2.

TABLE 2

| Composition of effluent (g/1,000 ml) | | | | |
|---|---|---|---|---|
| Ga | In | Zn | Al | Fe |
| tr. | 0.001 | 22.4 | 9.9 | 12.6 |

Table 2 shows that by the first passage through an ion exchange resin column, almost all of the gallium and indium that were present in the leach solution could be adsorbed on the resin, but the greater part of the Zn, Al and Fe contents were carried into the effluent without being adsorbed onto the resin.

The resin was then eluted with 3N sulfuric acid, and 4.8 liters of an eluate was obtained. The composition of the eluate is shown in Table 3.

TABLE 3

| | Composition of eluate (g/1,000 ml) | | | | |
|---|---|---|---|---|---|
| | Ga | In | Zn | Al | Fe |
| Absolute content | 0.14 | 0.16 | 0.25 | 1.25 | 0.13 |
| Relative content | 1 | 1.14 | 1.79 | 8.93 | 0.92 |

The eluate was adjusted to a pH of 2.8 with an alkali agent. In order to maintain the reducing nature of the eluate, sodium hydrogensulfite was added to provide a composition indicated in Table 4. The so treated eluate was passed through a column packed with 60 ml of UNICELLEX UR-50 ®, a chelating ion exchange resin manufactured by UNITIKA, LTD. The feed rate was S.V. 1.0. The resulting effluent had a composition shown in Table 5.

TABLE 4

| Composition of neutralized eluate (g/1,000 ml) | | | | |
|---|---|---|---|---|
| Ga | In | Zn | Al | Fe |
| 0.14 | 0.15 | 0.25 | 0.90 | 0.11 |

TABLE 5

| Composition of effluent (g/1,000 ml) | | | | |
|---|---|---|---|---|
| Ga | In | Zn | Al | Fe |
| tr. | 0.001 | 0.24 | 0.84 | 0.10 |

Table 5 shows that by the second passage through an ion exchange resin, almost all of the gallium and indium that were present in the eluate from the first column could be adsorbed on the resin, but the greater part of the Zn, Al and Fe contents were carried into the effluent without being adsorbed onto the resin.

The resin bed was eluted with 2N hydrochloric acid, and 120 ml of an eluate (Ga and In concentrate) was obtained. The composition of the eluate is shown in Table 6.

TABLE 6

| | Composition of Ga/In concentrate (g/1,000 ml) | | | | |
|---|---|---|---|---|---|
| | Ga | In | Zn | Al | Fe |
| Absolute content | 5.6 | 6.0 | 0.05 | 0.80 | 0.03 |
| Relative content | 1 | 1.07 | 0.01 | 0.14 | 0.01 |
| Concentration ratio* | 40 | 40 | 0.2 | 0.89 | 0.27 |

*Concentration ratio = concentration of a particular ion species in concentrate / concentration of a particular ion species in neutralized eluate As will be apparent from the above data, the method of the present invention could recover a Ga and In concentrate in high yield from a leach solution from zinc smelting, and the recovery yields were 100% for gallium and 92% for indium.

EXAMPLE 2

The procedure of Example 1 was repeated except that an eluate from the first resin column having the composition indicated in Table 3 was passed through the second resin column, which was eluted with 3N sulfuric acid, rather than 2N hydrochloric acid. A Ga/In concentrate was obtained as an eluate (120 ml), whose composition is shown in Table 7.

TABLE 7

| | Composition of Ga/In concentrate (g/1,000 ml) | | | | |
|---|---|---|---|---|---|
| | Ga | In | Zn | Al | Fe |
| Absolute content | 5.2 | 5.3 | 0.05 | 0.80 | 0.03 |
| Relative content | 1 | 1.02 | 0.01 | 0.15 | 0.01 |
| Concentration ratio | 37 | 35 | 0.20 | 0.89 | 0.27 |

Again, high recovery yields of Ga and In were obtained in the final concentrate, and they were respectively 95% and 82%.

EXAMPLE 3

In this example, gallium was selectively recovered from an aluminum rich slime containing a small amount of gallium.

The gallium-containing aluminum rich slime was dissolved with sulfuric acid, pH-adjusted, and mixed with a reducing agent to provide a solution having the composition indicated in Table 8.

TABLE 8

| | Composition of feed solution (g/1,000 ml) | | | | |
|---|---|---|---|---|---|
| | Ga | Al | Na | As | Fe |
| Absolute content | 0.008 | 36.2 | 14.5 | 1.43 | 0.44 |
| Relative content | 1 | ca. 4500 | ca. 2000 | ca. 200 | ca. 50 |

Relative content = concentration of a particular ion species in solution / concentration of Ga in solution The solution shown in Table 8 was passed through a column packed with UNICELLEX UR-50 ®, a chelating ion exchange resin manufactured by UNITIKA, LTD. The feed rate was S.V. 1.0. The resulting effluent had the composition indicated in Table 9.

TABLE 9

| Composition of effluent (g/1,000 ml) | | | | |
|---|---|---|---|---|
| Ga | Al | Na | As | Fe |
| 0.001 | 35.9 | 14.3 | 1.42 | 0.43 |

As Table 9 shows, the effluent was substantially free of gallium whereas almost all of the Al, Na, As and Fe contents were carried into the effluent without being adsorbed onto the resin.

The Ga ions were then desorbed from the resin by elution with sulfuric acid. The resulting eluate had the composition indicated in Table 10.

TABLE 10

| | Composition of eluate (g/1,000 ml) | | | | |
|---|---|---|---|---|---|
| | Ga | Al | Na | As | Fe |
| Absolute content | 0.04 | 2.78 | 0.87 | 0.005 | 0.05 |
| Relative content | 1 | ca. 70 | ca. 20 | 0.13 | 1.25 |

The eluate was pH-adjusted with an alkali agent, and after maintaining its reducing nature by addition of a reducing agent, the eluate was passed through a column packed with UNICELLEX UR-50 ®, a chelating ion exchange resin of UNITIKA, LTD. The feed rate was S.V. 1.0. The composition of the effluent from the column is shown in Table 11.

TABLE 11

| Composition of effluent (g/1,000 ml) | | | | |
|---|---|---|---|---|
| Ga | Al | Na | As | Fe |
| ≦0.001 | 2.15 | 1.24 | ≦0.005 | 0.04 |

The Ga ions were then desorbed from the resin by elution with hydrochloric acid. The resulting eluate (Ga concentrate) had the composition indicated in Table 12.

TABLE 12

| | Composition of Ga concentrate (g/1,000 ml) | | | | |
|---|---|---|---|---|---|
| | Ga | Al | Na | As | Fe |
| Absolute content | 16.0 | 3.28 | 0.40 | ≦0.001 | 0.80 |
| Relative content | 1 | 0.21 | 0.03 | — | 0.05 |
| Concentration ratio* | 400 | 1.18 | 0.46 | — | 16 |

*Concentration ratio = $\frac{\text{concentration of a particular ion species in Ga concentrate}}{\text{concentration of a particular ion species in eluate (Table 10)}}$ As Table 12 shows, the method of the present invention enabled complete and selective recovery of gallium from the aluminum rich slime dissolved with $H_2SO_4$.

EXAMPLE 4

In this example, indium was selectively recovered from a solution produced in a smelter of a non-ferrous metal and which had the composition shown in Table 13.

TABLE 13

| | Composition of the Zn, Cd and Ni-containing solution (g/1,000 ml) | | | |
|---|---|---|---|---|
| | In | Zn | Cd | Ni |
| Absolute content | 0.24 | 28.5 | 14.6 | 1.80 |
| Relative content* | 1 | ca. 100 | ca. 60 | ca. 10 |

*Relative content = $\frac{\text{concentration of a particular ion species in the solution}}{\text{concentration of In in the solution}}$ The solution shown in Table 13 was given the same treatment as in Example 3, thereby producing an eluate of the composition indicated in Table 14 and an In concentrate with the composition shown in Table 15.

TABLE 14

| | Composition of eluate (g/1,000 ml) | | | |
|---|---|---|---|---|
| | In | Zn | Cd | Ni |
| Absolute content | 0.30 | 0.25 | 0.03 | 0.19 |
| Relative content | 1 | 0.83 | 0.10 | 0.63 |

TABLE 15

| | Composition of In concentrate (g/1,000 ml) | | | |
|---|---|---|---|---|
| | In | Zn | Cd | Ni |
| Absolute content | 11.6 | 0.04 | 0.01 | 0.62 |
| Relative content | 1 | — | — | 0.05 |
| Concentration ratio* | ca. 40 | 0.16 | — | 3.26 |

*Concentration ratio = $\frac{\text{concentration of a particular ion species in In concentrate}}{\text{concentration of a particular ion species in eluate}}$ Table 15 shows that the method of the present invention could achieve an indium recovery of as high as 95% from a solution containing high Zn, Cd and Ni levels.

What is claimed is:

1. A method of selective separation and concentration of at least one of gallium and indium from a solution containing them in low concentrations and containing other metal ions in relatively high concentrations, which comprises the steps of
   (1) providing a solution containing at least one of gallium and indium, said solution also containing metal ions other than gallium and indium in concentrations at least ten times that of gallium and indium and having a pH between 1.0 and 4.0;
   (2) passing said solution through a bed of a chelating ion exchange resin having an amino carboxylic acid group whereby said at least one of gallium and indium is adsorbed in said ion exchange resin;
   (3) eluting said ion exchange resin with a mineral acid to desorb said at least one of gallium and indium and to form an eluate containing the desorbed metals;
   (4) adjusting the pH of the eluate to between 1.0 and 4.0;
   (5) passing the adjusted eluate through a bed of a chelating ion exchange resin having an amino carboxylic acid group whereby said at least one of gallium and indium is adsorbed on said ion exchange resin; and
   (6) eluting the materials on the resin with a mineral acid to desorb said at least one of gallium and indium and recovering said at least one of gallium and indium from the resulting eluate wherein it is present in a concentrated amount.

2. The method of claim 1 wherein said chelating ion exchange resin having an amino carboxylic acid group is a chelate resin prepared by crosslinking in a network structure a phenolic compound, a phenol and an aldehyde, said phenolic compound having the formula:

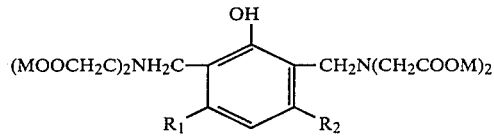

wherein M is an alkali metal or hydrogen; $R_1$ and $R_2$ are each hydrogen or an alkyl group having 1 to 3 carbon atoms.

3. The method of claim 1 or 2 wherein said solution provided in step (1) contains 0.001 to 1.0 g/l of at least one of gallium and indium, and a total of 2 to 70 g/l of one or more elements selected from the group consisting of Fe, Al, Zn, As, Na and other metal ions.

4. The method of claim 2 wherein the pH of the solutions and the temperatures of the solutions passed through said beds of ion exchange resin in steps (2) and (5) have a pH of from 2.0 to 3.0 and a temperature of from 20° to 30° C.

5. The method of claim 4 wherein the space velocity of the solution through the bed in step (2) is between 0.5 and 1.5 and the space velocity of the solution through the bed in step (5) is from 1.0 to 3.0.

6. The method of claim 5 wherein if said solution of step (1) contains ferric ions, said ferric ions are reduced to ferrous ions before step (2) and if the eluate of step (4) contains ferric ions, said ferric ions are reduced to ferrous ions before step (5).

7. The method of claim 1 or 2 wherein said solution provided in step (1), is in step (2) passed through the bed of said chelating ion exchange resin having an amino carboxylic acid at a space velocity of not more than 5.0.

8. The method of claim 1 or 2 wherein said step (2) and said step (5) are carried out by using at least two columns packed with said chelating ion exchange resin with an amino carboxylic acid.

9. The method of claim 1 or 2 wherein the temperature of the solutions which are passed through said ion exchange resin beds in steps (2) and (5) are at a temperature between 10° and 50° C. and wherein the solution in step (5) is passed through the bed at a space velocity of not more than 5.0.

* * * * *

UNITED STATES PATENT AND TRADEMARK OFFICE
CERTIFICATE OF CORRECTION

PATENT NO. : 4,517,096
DATED : May 14, 1985
INVENTOR(S) : Kunio SEKINE, et al

It is certified that error appears in the above-identified patent and that said Letters Patent is hereby corrected as shown below:

Column 2, line 13, after "or minute amounts" change the word "of" to --in--;

Column 8, line 53 (claim 4), change "claim 2" to --claim 3--.

Signed and Sealed this

Fourteenth Day of January 1986

[SEAL]

Attest:

Attesting Officer

DONALD J. QUIGG

Commissioner of Patents and Trademarks